United States Patent
Wang et al.

(10) Patent No.: US 9,900,805 B2
(45) Date of Patent: Feb. 20, 2018

(54) SYNCHRONIZING CALL STATES OF NETWORK COMPONENT AND MOBILE DEVICE AT SESSION TRANSFER

(71) Applicant: Telefonaktiebolaget L M Ericsson (publ), Stockholm (SE)

(72) Inventors: Chunbo Wang, Shanghai (CN); Jan Holm, Stora Skedvi (SE); Karl-Peter Ranke, Herzogenrath (DE); Oliver Speks, Eschweiler (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/767,177

(22) PCT Filed: Feb. 12, 2013

(86) PCT No.: PCT/EP2013/052737
§ 371 (c)(1),
(2) Date: Aug. 11, 2015

(87) PCT Pub. No.: WO2014/124658
PCT Pub. Date: Aug. 21, 2014

(65) Prior Publication Data
US 2015/0382251 A1     Dec. 31, 2015

(51) Int. Cl.
*H04W 36/00* (2009.01)
*H04L 29/06* (2006.01)
(Continued)

(52) U.S. Cl.
CPC ..... *H04W 36/0022* (2013.01); *H04L 65/1016* (2013.01); *H04L 65/1066* (2013.01);
(Continued)

(58) Field of Classification Search
CPC ...... H04W 36/30; H04W 36/12; H04W 36/14
(Continued)

(56) References Cited

U.S. PATENT DOCUMENTS

| 8,369,822 B2* | 2/2013 | Hursey | H04M 11/04 379/37 |
| 2005/0096067 A1* | 5/2005 | Martin | G01S 5/0027 455/456.1 |

(Continued)

FOREIGN PATENT DOCUMENTS

| EP | 2 343 922 A1 | 7/2011 |
| GB | 2480106 A | 11/2011 |

(Continued)

OTHER PUBLICATIONS

International Search Report and Written Opinion of the International Searching Authority, Application No. PCT/EP2013/052737, dated Nov. 28, 2013.

(Continued)

*Primary Examiner* — Nghi H Ly
(74) *Attorney, Agent, or Firm* — Sage Patent Group

(57) ABSTRACT

A technique is provided for synchronizing a first call state of a network component and a second call state of a mobile device. The mobile device is connectable to a network via a first Radio Access Technology (RAT) and a second RAT. The network forwards towards a callee an invitation for a call originating via the first RAT from the mobile device. The network sends a first message corresponding to a callee response towards the mobile device. The network component triggers a transfer of the call session of the mobile device from the first RAT to the second RAT. The first call state is set by the response of the callee. Information indicative of the second call state is received from the mobile device, and a second message for changing the second call state by the response is provided to the mobile device when inconsistent first and second call states.

22 Claims, 11 Drawing Sheets

(51) Int. Cl.
*H04W 56/00* (2009.01)
*H04W 80/10* (2009.01)
*H04W 88/02* (2009.01)

(52) U.S. Cl.
CPC .......... *H04W 56/001* (2013.01); *H04W 80/10* (2013.01); *H04W 88/02* (2013.01)

(58) Field of Classification Search
USPC ...... 455/439, 436, 442, 435.1, 432.1, 422.1; 370/331
See application file for complete search history.

(56) References Cited

U.S. PATENT DOCUMENTS

| | | | | |
|---|---|---|---|---|
| 2007/0189475 | A1* | 8/2007 | Pearson | H04M 1/274516 379/142.01 |
| 2009/0238168 | A1* | 9/2009 | Lavoie | H04L 65/1046 370/352 |
| 2009/0325608 | A1* | 12/2009 | Cheng | H04W 68/12 455/458 |
| 2015/0220556 | A1* | 8/2015 | Lunden | G06F 17/30174 707/618 |

FOREIGN PATENT DOCUMENTS

| | | |
|---|---|---|
| RU | 2011102978 A | 8/2012 |
| WO | WO 2009/158626 A1 | 12/2009 |
| WO | WO 2011/160928 A1 | 12/2011 |

OTHER PUBLICATIONS

International Preliminary Report on Patentability, Application No. PCT/EP2013/052737, dated Feb. 13, 2015.
3GPP, Technical Specification, "3rd Generation Partnership Project; Technical Specification Group Services and System Aspects; Single Radio Voice Call Continuity (SRVCC); Stage 2 (Release 11)", 3GPP TS 23.216 V11.8.0 (Mar. 2013), 67 pp.
3GPP, Technical Specification, "3rd Generation Partnership Project; Technical Specification Group Services and System Aspects; IP Multimedia Subsystem (IMS) Service Continuity; Stage 2 (Release 12)", 3GPP TS 23.237 V12.2.0 (Mar. 2013), 169 pp.
3GPP, Technical Specification, "3rd Generation Partnership Project; Technical Specification Group Core Network and Terminals; IP Multimedia (IM) Core Network (CN) subsystem IP Multimedia Subsystem (IMS) Service Continuity; Stage 3 (Release 12)", 3GPP TS 24.237 V12.0.0 (Mar. 2013), 390 pp.
Motorola et al., "Alternative Handover flow for IMS-capable HNB", Document for: Approval/Discussion, Agenda Item: 7.4.6, Work Item/Release: EHNB-IMS/Rel-9, SA WG2 Temporary Document, 3GPP TSG SA WG2 Meeting #73, TD S2-093275, Tallinn, Estonia, May 11-15, 2009, 2 pp.
Motorola et al., "Finalizing the consolidated architecture for IMS-capable HNB subsystem with the SIP UA in the HNB", Document for: Approval; Agenda Item: 9.2, Work Item / Release: EHNB-IMS, SA WG2 Temporary Document, 3GPP TSG SA WG2 Meeting #75, TD S2-095246, Kyoto, Japan, Aug. 31—Friday Sep. 4, 2009, 16 pp.
Samsung et al., "Discussion: Evaluations of solutions for synchronising state for SRVCC-Alerting", Agenda Item: 11.19.1, Document for: Agreement, 3GPP-TSG CT WG1 Meeting #67, Barcelona, Spain, Oct. 11-15, 2010, 2 pp.
Office Action for corresponding RU 2015138926(059721), dated Sep. 16, 2016, including English transiation. (16 pages).
V. Dorot et al: "Explanatory Dictionary of Modern Computer Lexis" ($2^{nd}$ edition), BHV-Petersburg, Saint-Petersburg, 2001—L1, p. 339). No English Translation.
Decision on Grant for corresponding Russian Patent Application No. 2015138926 dated Jan. 27, 2017, including English translation. (16 pages).

* cited by examiner

SYNCHRONIZING CALL STATES OF NETWORK COMPONENT AND MOBILE DEVICE AT SESSION TRANSFER

CROSS REFERENCE TO RELATED APPLICATION

This application is a 35 U.S.C. §371 national stage application of PCT International Application No. PCT/EP2013/052737, filed on 12 Feb. 2013, the disclosure and content of which is incorporated by reference herein in its entirety. The above-referenced PCT International Application was published in the English language as International Publication No. WO 2014/124658 A1 on 21 Aug. 2014.

TECHNICAL FIELD

The present disclosure generally relates to a technique for synchronizing a first call state of a network component of a telecommunication network and a second call state of a mobile device that is connectable to the telecommunication network by means of a first Radio Access Technology and a second Radio Access Technology. More specifically, and without limitation, the present disclosure relates to a technique for transferring a mobile telecommunication session during session setup, such as a call in an alerting or pre-alerting state.

BACKGROUND

The steady evolution of mobile telecommunication brings about changes to the Radio Access Network (RAN) and/or the Core Network (CN) of a telecommunications network. Such changes are preferably implemented in a step-by-step migration. As an example, a network operator providing service coverage according to the Universal Mobile Telecommunication System (UMTS) may want to move voice services to Voice over Internet Protocol (VoIP) using an Internet Protocol Multimedia Subsystem (IMS) in the CN in conjunction with a RAT according to Long Term Evolution (LTE). Since UMTS provides voice services in the circuit-switched domain, the operator would have to provide ubiquitous LTE coverage at the first day of VoIP service, in order to prevent that a call initiated in the packet-switched domain according to LTE is discontinued as the mobile caller leaves the LTE coverage area.

Single Radio Voice Call Continuity (SRVCC) according to standard document 3GPP TS 23.216 (Release 11, Version 11.7.0) specifies a technique for service continuation of IMS voice calls. The IMS voice call can, for example, originate in the packet-switched domain using a conversational VoIP bearer according to the Quality of Service (QoS) Class Identifier "QCI1". The QCI1 VoIP bearer is merely one example for an Evolved Packet System (EPS) bearer. In UMTS and GPRS, data sessions are established differently using the Packet Data Protocol (PDP) context procedure. SRVCC provides the ability of transferring a voice call from the packet-switched domain of LTE using VoIP and IMS to the circuit-switched domain of UMTS. SRVCC thus provides a fallback position when introducing VoIP services according to the LTE standard.

Standard documents 3GPP TS 23.237 (Release 12, Version 12.1.0) and 3GPP TS 24.237 (Release 11, Version 11.4.0) specify the SRVCC transfer for video and voice calls in an Alerting Call State. The Alerting Call State of a session may be defined as the state of a party engaged in a session that is in an early dialog state according to Sect. 12.1 of RFC 3261. Alternatively or in addition, the Alerting Call State of the call may be defined as the state of a session with a speech media component after exchanging an initial "SIP INVITE" request that initiates the dialog and a "SIP 180" Ringing response that indicates the alerting, and before exchanging a SIP final response for the initial "SIP INVITE" request that establishes the session according to Clause 12.1 of standard document 3GPP TS 24.237.

Due to a potential radio interruption during the SRVCC transfer, the state of the calling User Equipment (UE) and the state of one or more components of the telecommunications network, such as a Mobile Switching Center (MSC) server, may become out of synchronization. To tackle the possible incompatibility of call states between the calling UE and the MSC server, the standard document 3GPP TS 24.237 recommends that the MSC server verify the call state using the "STATUS ENQUIRY" procedure of standard document 3GPP TS 24.008 (Release 12, Version 12.0.0). If the call states are incompatible, the transferred session is released according to standard document 3GPP TS 24.237, Clause 12.6.3, Note 3.

Document WO 2011/139045 A2 teaches a technique for synchronizing different call states at the remote other end of the dialog. Here, an incompatibility is caused by the called UE answering the call just before the called UE is handed over from the packet-switched mode to the circuit-switched mode according to SRVCC. No solution is provided for synchronizing the calling UE and the telecommunications network from which the call is originating.

Thus, incompatible session states can arise in the prior art and lead to an unexpected termination of the session.

SUMMARY

There is a need for a technique that improves success rates of session transfer for a communication session with changing session states.

According to one aspect, a method of synchronizing a first call state of a network component of a telecommunications network and a second call state of a mobile device is provided. The mobile device is connectable to the telecommunications network by means of a first Radio Access Technology and a second Radio Access Technology, wherein the telecommunications network is configured to forward towards a callee an invitation for a call originating by means of the first Radio Access Technology from the mobile device and to send a first message corresponding to a response of the callee towards the mobile device by means of the first Radio Access Technology. The method comprises the steps performed by the network component of setting the first call state in accordance with the response of the callee, receiving information indicative of the second call state from the mobile device, and providing to the mobile device by means of the second Radio Access Technology a second message for inducing a change of the second call state in accordance with the response of the callee in case the first call state and the second call state are inconsistent.

The first call state and the second call state may be consistent before receiving the response of the callee and/or before initiating the transfer. The network may receive the response from the callee. The first message sent towards the mobile device may indicate a change of the call state. The inconsistency may be determined by receiving the information indicative of the second call state from the mobile device. The information indicative of the second call state may be received from the mobile device after at least one of the transfer of the mobile device and the sending of the first message. The inconsistency may indicate that the first message sent towards the mobile device was not received. The first message sent towards the mobile device may be lost due to a radio connection break before the transfer or during the transfer. For setting the first call state in accordance with the response of the callee, the network component may be indirectly informed of the response of callee, e.g., by means of an information message received from the network. For example, the information message may indicate that the callee has responded with a ringing response or has answered the call. If the response of the callee is an SIP 180 ringing response, the information message may include an "INFO (alerting)" message. If the response indicates that callee has answered the call, the information message may include an SIP 200 OK final response.

The second message may be provided after completion of the transfer. The second message provided to the mobile device, if the first call state and the second call state are inconsistent, may induce a change of the second call state. The change of the second call state may bring the second call state in consistency with the first call state.

The second message corresponding to the received response of the callee may be directly or indirectly derived from the response. E.g., the response may be mapped to a message that implies the same call state that is implied by the response. The response may be mapped to a message out of a set of messages compatible with the second Radio Access Technology and based on the call state implied by the response.

The method may further comprise the step performed by the telecommunications network of assessing consistency of the first call state and the second call state. The second call state received from the mobile device may be retrieved. Retrieving the second call state may include signaling a status enquiry to the mobile device. Alternatively or in addition, the mobile device may send the information indicative of the second call state in response to completion of the transfer.

The mobile device may be selectively connectable to the telecommunications network via a first Radio Access Technology and a second Radio Access Technology. Before and after the transfer, the mobile device may be connected to either the first Radio Access Technology or the second Radio Access Technology. During the transfer, a radio break may occur so that the mobile device may be connected to neither the first Radio Access Technology nor the second Radio Access Technology.

The sent first message may be sent prior to, during or after the transfer. The transfer may be performed in a Pre-Alerting Call State or an Alerting Call State of the call.

Each of the first Radio Access Technology and the second Radio Access Technology may be defined by a corresponding Radio Access Network or by a corresponding bearer type or by a combination of Radio Access Network and bearer type. The bearer type may be, e.g., a packet-switched bearer or a circuit-switched bearer. The transfer of the call may imply a change of the Radio Access Network used for the connection between the telecommunications network and the mobile device and/or a change of the bearer type used for communication between the telecommunications network and the mobile device.

The transfer may include at least one of a session transfer and an access transfer. The transfer may include a transfer from a packet-switched domain to a circuit-switched domain. The transfer may be a session transfer of the call session. The transfer may entail an access transfer. The packet-switched domain may use the first Radio Access Technology. The circuit-switched domain may use the second Radio Access Technology. The first Radio Access Technology may be implemented by an evolved UTRAN (E-UTRAN). The second Radio Access Technology may be implemented by a UMTS Terrestrial Radio Access Network (UTRAN) or a GSM EDGE RAN (GERAN). The transfer may be a Single Radio Voice Call Continuity (SRVCC) transfer. Performing the transfer may include updating a remote leg towards the callee.

At least one of the invitation and the response may be exchanged in the packet-switched domain. At least one of the invitation and the response may be exchanged in accordance with the Session Initiation Protocol (SIP). The invitation may be a SIP INVITE request. The invitation may include data according to a Session Description Protocol (SDP). The received response may be indicative of progress in establishing the call. The response may be a provisional response or a final response to the invitation. The response may be a SIP response having a SIP code. The response may include a SIP 180 response indicating that the callee is ringing or a SIP 200 OK response indicating success of the call invitation.

The response may be received in an early dialog state of the SIP. The early dialog state may be established by advancing the invitation. Alternatively or in addition, the early dialog state may be defined according to Request for Comments (RFC) 3261, Sect. 12. The early dialog state may be established by or after receiving a provisional response to the invitation and/or before receiving a final response to the invitation.

The second message may be provided in the circuit-switched domain. The second message may be a call control signal, e.g., a Circuit-Switched Connect signal. A Circuit-Switched Connect Acknowledgment signal may be received from the mobile device in response to the second message. At least a part of the communication within a core network of the telecommunications network may use a packet-switched protocol before and after the transfer. After the transfer, communication of a mobile convergence component, e.g. an Internet Protocol Multimedia Subsystem (IMS), towards a domain dedicated for the first RAT, e.g. a packet-switched domain, may be released. The communication of the mobile convergence component may be via a domain dedicated for the second RAT, e.g. a circuit-switched domain, including the network component.

Prior to the transfer, the network component may receive an indication of the transfer. The indication may be based on a measurement. The mobile device may perform the measurement. The measurement may indicate that the mobile device moves out of a coverage region of the first Radio Access Technology. The measurement may be performed by the mobile device in a measurement gap scheduled by a Radio Access Network providing the first Radio Access Technology. The indication may originate from the Radio Access Network providing the first Radio Access Technology.

The network component may be used in conjunction with the second Radio Access Technology. The network component may be unused for communication via the first Radio Access Technology. The network component may include a Mobile-services Switching Center (MSC) communicating towards the mobile device by means of the second Radio Access Technology. As used herein, the term MSC may encompass an MSC server, also abbreviated by MSC-S.

The telecommunications network may include an Internet Protocol Multimedia Subsystem (IMS) selectively communicating towards the mobile device by means of the first Radio Access Technology and the second Radio Access Technology. The call may be anchored at the IMS. As used herein, the term IMS may encompass an IMS server, also abbreviated by IMS-S. The IMS may include at least one of Intermediate Internet Protocol Multimedia Core Network Subsystem entities (Intermediate IM CN subsystem entities) and a Service Centralization and Continuity Application Server (SCC-AS).

The information message as to the response of the callee, based on which the first call state is set or changed, may be received by the MSC from the IMS. The second message may be derived from at least one of the information message as to the response of the callee and the information indicative of the second state received from the mobile device. Alternatively or in combination, the second message may be derived from the information indicative of the second state received from the mobile device, if the second state is inconsistent with the first state. For example, a Mobile Originating Alerting information message may be received when the response of the callee includes a SIP 180 response.

States assumable by each of the first call state and the second call state may include a Call Proceeding State, a Call Delivered State and an Active Call State. The Call Proceeding State may be assumed by both the first call state and the second call state upon or after forwarding the invitation. The Call Proceeding State may also be referred to as a Mobile Originating Call Proceeding State or a Pre-Alerting Call State.

A provisional response of the callee, e.g., the SIP 180 response, may induce the setting of the first call state of the network component to the Call Delivered State or may change the first call state from the Call Proceeding State to the Call Delivered State. Alternatively or in combination, the network component, e.g., the MSC, may assume the Call Delivered State in response to receiving a SIP INFO request in the early dialog. The first message corresponding to the provisional response, e.g., a further SIP 180 response message, may have the potential of inducing the second call state of the mobile device to change from the Call Proceeding State to the Call Delivered State before the transfer, if the first message was not lost. The Call Delivered State may also be referred to as an Alerting Call State.

A final response of the callee, e.g., a SIP 200 OK response, may induce the setting of the first call state to the Active Call State or the change of the first call state from the Call Delivered State to the Active Call State. The first message corresponding to the final response, e.g., a further SIP 200 OK response message, may have the potential of inducing the second call state to change from the Call Delivered State to the Active Call State before the transfer, if the first message was not lost. In addition, the signal communication may include a further provisional response that does not induce changing or setting a call state, e.g., a SIP 183 response.

The network component may provide a release message to the mobile device in case the received information indicative of the second call state indicates none of the Call Proceeding State, the Call Delivered State and the Active Call State. The network component, e.g. the MSC, clears the call in case none of the Call Proceeding State, the Call Delivered State and the Active Call State is received as the second state in the status enquiry of the mobile device.

The technique presented herein may be realized in the form of software, in the form of hardware, or using a combined software/hardware approach. As regards a further aspect, a computer program product comprising program code portions for performing the steps presented herein when the computer program product is run on at least one computing device is provided. The computer program product may be stored on a computer-readable recording medium such as a memory chip, e.g. a flash memory chip, an optical recording medium and a hard disk. Moreover, the computer program product may be provided for download onto such a recording medium.

As to a hardware aspect, a network component for synchronizing a first call state of the network component of a telecommunications network and a second call state of a mobile device is provided. The mobile device is connectable to the telecommunications network by means of a first Radio Access Technology and a second Radio Access Technology, wherein the telecommunications network is configured to forward towards a callee an invitation for a call originating via the first Radio Access Technology from the mobile device and to send a first message corresponding to a response of the callee towards the mobile device by means of the first Radio Access Technology. The network component comprises a setting unit adapted to set the first call state in accordance with the response of the callee, a receiving unit adapted to receive information indicative of the second call state from the mobile device, and a providing unit adapted to provide to the mobile device by means of the second Radio Access Technology a second message for inducing a change of the second call state in accordance with the response of the callee in case the first call state and the second call state are inconsistent.

The network component may be located in the telecommunications network. The network component may be located in a Mobile-services Switching Center (MSC) of the telecommunications network.

According to a still further aspect, a telecommunications network is provided. The telecommunications network comprises an Internet Protocol Multimedia Subsystem (IMS) adapted to anchor a call; and a Mobile-services Switching Center (MSC) including a network component according to the apparatus aspect. The telecommunications network may further comprise a domain dedicated for the second RAT, e.g. a packet-switched domain. The packet-switched domain may include at least one of an MME and gateways, e.g. an SGW and a PGW.

BRIEF DESCRIPTION OF THE DRAWINGS

Further aspects and advantages of the technique presented herein will become apparent from the following description of exemplary embodiments and the drawings, wherein FIG. 1 schematically illustrates a mobile telecommunications system for implementing the technique in a network component of a telecommunications network.

DETAILED DESCRIPTION

In the following description of embodiments, for purposes of explanation and not limitation, specific details are set forth, such as particular network components and sequences of steps, in order to provide a thorough understanding of the present invention. It will be apparent to one skilled in the art that the technique described herein can be practiced in other embodiments that depart from these specific details. For example, while the following embodiments are primarily described in the context of Single Radio Voice Call Continuity (SRVCC) according to Release 11 and expected Release 12 of standard specification 3GPP TS 23.216 (Version 11.7.0), the technique can also be implemented in the context of any other Voice Call Continuity (VCC), for example according to Release 7 of standard specification 3GPP TS 23.206 (Version 7.5.0). While the embodiments relate to an exemplary LTE implementation of VCC from a packet-switched domain to a circuit-switched domain, it is readily apparent to the skilled person that the technique described herein can also be implemented for VCC transfers from the circuit-switched domain to the packet-switched domain and in other mobile or stationary communication networks, e.g., including UMTS networks and GSM networks. Furthermore, the technique can also be implemented for any type of session not limited to voice services. For example, the session can, alternatively or in addition to voice services, include a video telephony service, a media streaming service or a multiplayer online game service.

Moreover, those skilled in the art will appreciate that services, components, functions and steps explained herein can be implemented using software functioning in conjunction with a programmed microprocessor, an Application Specific Integrated Circuit (ASIC), Digital Signal Processor (DSP) or a general purpose computer. It will also be appreciated that, while the following embodiments will primarily be described in context with methods and devices, the invention can also be embodied in a computer program product as well as a system comprising a computer processor and a memory coupled to the processor, wherein the memory is encoded with one or more programs that implement the services and components and that perform the functions and steps disclosed herein.

Figure 1:
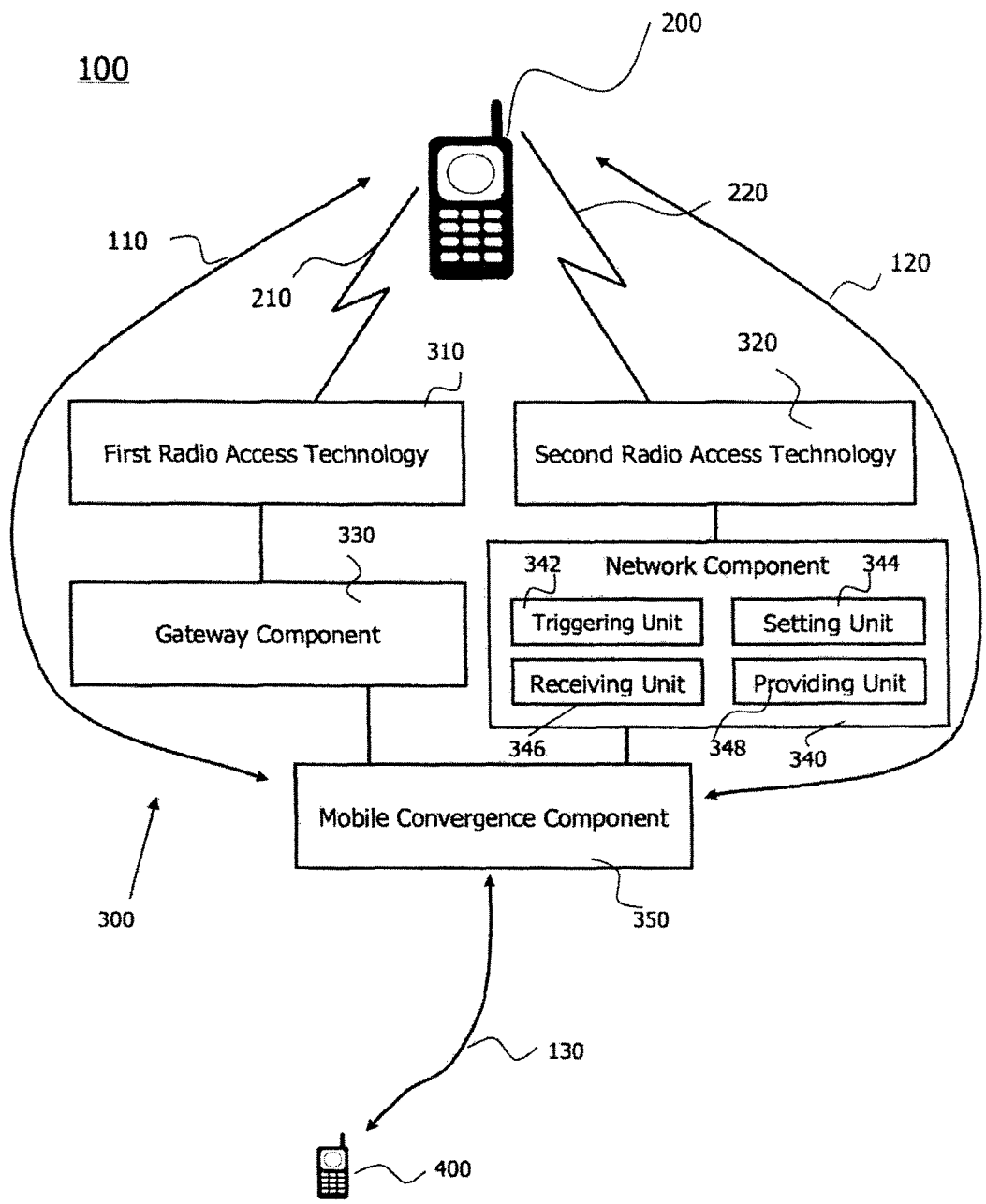

A mobile telecommunications system 100 shown in FIG. 1 provides an exemplary environment for implementing the technique. The communication system 100 includes a mobile device 200, a telecommunications network 300 and a remote communication device 400. The mobile device 200 is adapted for wireless communication 210 and 220 according to a first Radio Access Technology (RAT) and a second RAT, respectively.

The telecommunications network 300 provides a first RAT 310 and a second RAT 320. In one implementation of the telecommunications network 300, the first RAT 310 and the second RAT 320 are provided by a first Radio Access Network and a second Radio Access Network, respectively. In a second implementation of the telecommunications network 300, the same Radio Access Network provides both the first RAT 310 and the second RAT 320. The first RAT 310 provides a first access leg 110 via a gateway component 330 towards a mobile convergence component 350.

The telecommunications network 300 further includes a network component 340 coupled to the mobile convergence component 350. The network component 340 is adapted to communicate with the mobile device 200 by means of to the second RAT 320. The second RAT 320 provides a second access leg 120 to the mobile convergence component 350.

The mobile convergence component 350 directly or indirectly provides a remote leg 130 to the remote communication device 400. The remote leg 130 can use the first RAT 310, the second RAT 320 or a further RAT providing mobile access to the remote communication device 400. Alternatively, the remote communication device 400 is a stationary communication device and the remote leg 130 includes a landline access to the remote communication device 400.

Single Radio Voice Call Continuity (SRVCC) is implemented in the telecommunications network 300 so that radio coverage by the first RAT 310 is complemented with radio access via the second RAT 320. SRVCC has been specified initially in Release 8 of standard specifications 3GPP TS 23.216 and 3GPP TS 23.237 to support the transfer of an active call or other active session from an Evolved Universal Terrestrial Radio Access Network (E-UTRAN) or High-Speed Packet Access Network (HSPAN) as an example for implementing the first RAT 310 in the packet-switched domain to GERAN or UTRAN as an example for implementing the second RAT 320 in the circuit-switched domain. Since Release 10, SRVCC support for calls in an Alerting Call State is specified. SRVCC support for calls in a Pre-Alerting Call State is expected for Release 12.

By way of example, SRVCC according to standard specification 3GPP TS 23.216 provides Internet Protocol Multimedia Subsystem (IMS) Voice Call Continuity (VCC) for the conversational QCI1 VoIP bearer from E-UTRAN to the circuit-switched domain in GERAN or UTRAN, when the mobile device 200 is transmitting or receiving only via the second RAT 320 at a given time. To this end, the network component 340 is enhanced for SRVCC. E.g., a Mobile-services Switching Center (MSC) server enhanced for SRVCC according to Clause 5.2.2 of 3GPP TS 23.216 implements the network component 340.

Standard specifications TS 23.237 (Version 12.1.0) and TS 24.237 (Version 11.4.0) define the SRVCC transfer for calls in the Alerting Call State. In at least some implementations, the Alerting Call State can be defined as a state, wherein (i) the mobile device 200 is engaged in a session with speech media component in early dialog;

(ii) a ringing response to the invitation for a call to establish the session has been sent or received; and (iii) a final response for the invitation to establish the call session has not been sent or received.

Alternative or additional criteria defining the Alerting Call State of the call session are provided in Clause 12.2.3B.1 of standard specification 3GPP TS 24.237.

Figure 2:
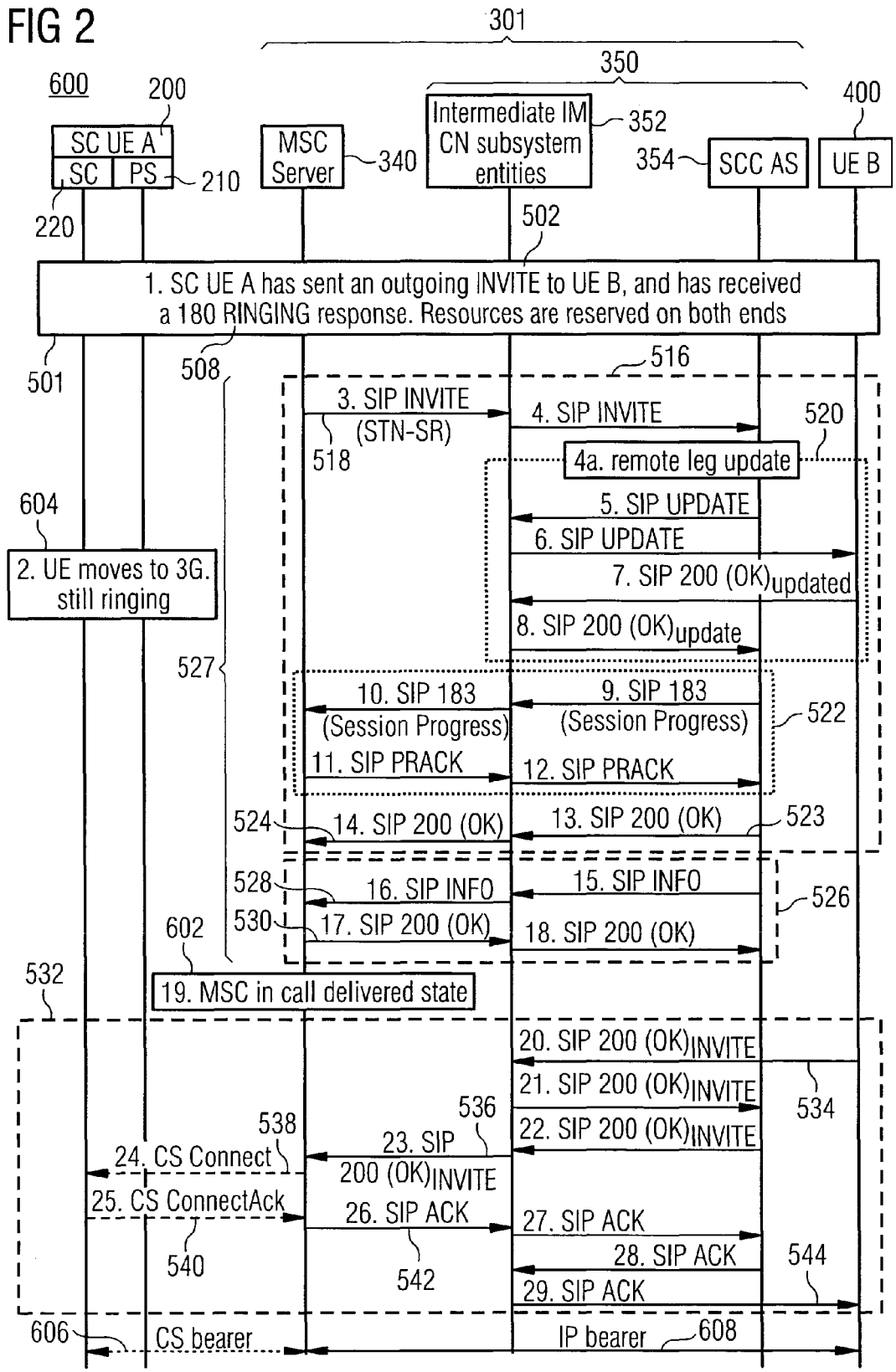
FIG. 2 schematically illustrates a signaling diagram for signals exchanged in the mobile telecommunications system of FIG. 1 according to an exemplary standard.

FIG. 2 schematically illustrates a signaling diagram 600 for a successful SRVCC transfer of a call originating from the mobile device 200 in the Alerting Call State (also referred to as a mobile originating alerting call) according to Annex A.17.3 of standard specification 3GPP TS 24.237. The mobile device 200 functions as the source User Equipment (denoted by SC UE A), i.e., the caller of the call. The mobile device 200 initially uses the first RAT 310 for a wireless connection 210 in the packet-switched domain. The mobile 200 is further adapted for a circuit-switched wireless connection 220 via the second RAT 320. For setting up a session dialog, signals 501 are exchanged via the first access leg 110 to the mobile convergence component 350 and via the remote leg 130 towards the remote communication device 400 functioning as the destination User Equipment (denoted by UE B). The mobile convergence component 350 includes Intermediate IP Multimedia CN subsystem entities 352 (also referred to as Intermediate IM CN subsystem entities) and a Service Centralization and Continuity Application Server (SCC-AS) 354. The network component 340 includes a Mobile Switching Center (MSC). The second access leg 120 including the network component 340 is not involved in the initial signal communication 501.

The initial signal communication 501 includes an invitation 502 for the call sent to the remote communication device 400. The initial signal communication 501 further includes a ringing response 508 received by the mobile device 200. The initial signal communication 501 further includes a trying response that is not shown in FIG. 2 for clarity. As a result of the initial signal communication 501, the involved components 200, 350 and 400 consistently consider the call to be in the Alerting Call State.

The outgoing call of the mobile device 200 is anchored at the SCC-AS 354 of the mobile convergence component 350. As the mobile device 200 moves out of the area covered by the first RAT 310, the network component 340 receives an indication for a transfer (which can subsequently entail an access transfer), as described in standard specification 3GPP TS 23.216. The network component 340 triggers a session transfer of the call session of the mobile device 200 using a Session Transfer Number (STN) for the SRVCC procedure as specified in standard specifications 3GPP TS 23.216 and 3GPP TS 23.237. Subscription information abbreviated by STN-SR includes a routing number indicating the SCC-AS 354 or an Access Transfer Control Function (ATCF), if SRVCC enhanced with ATCF is used.

Signals 516 exchanged in the network 300 for performing the transfer from the first RAT 310 to the second RAT 320 establish a communication path between the remote communication device 400 and the network component 340.

An invitation 518 including the STN-SR for the transfer is sent by the network component 340 to the mobile convergence component 350. The mobile convergence component 350 provides updating signals 520 towards the remote leg 130 including an update request. The update request contains a Session Description Protocol (SDP) offer for communication between the remote communication device 400 and the network component 340. The remote communication device 400 provides an OK response signal including an SDP answer to the mobile convergence component 350. The SDP answer indicates that resources are available. Further definitions for the exchange of offer and answer according to the SDP are provided in documents RFC 3264 and RFC 6157.

The mobile convergence component 350 sends a session progress response containing the SDP answer to the network component 340 in signal communication 522. The session progress response is provided by the mobile convergence component 350 with a Recv-Info header field to the network component 340. The session progress response is a so-called reliable response that requires a provisional acknowledgment.

The mobile convergence component 350 sends an OK response signal 523, 524 to the network component 340 for acknowledging the provisional acknowledgment from the network component 340. The signal 524 thus concludes the session progress provisional response of the signal communication 522 and the transfer communication 516 initiated by the invitation signal 518 for the transfer.

In signal communication 526, the network component 340 is informed that the call, which is transferred, is in the originating Alerting Call State. The signal communication 516 for the transfer and the signal communication 526 informing the network component 340 as to the Alerting Call State are collectively indicated by reference sign 527.

As a result of the initial signal communication 501 triggered by the calling mobile device 200 and the transfer signal communication 527 triggered by the need for the transfer, a first call state 602 of the network component 340 is consistent with a second call state 604 of the mobile device 200. Both the first call state and the second call state assume the Alerting Call State, which is also referred to as a call delivered state or a ringing state.

A dialog, such as the dialog initiated by the invitation signal 502, is referred to as an early dialog as long as a final response in signal communication 532, such as a response 534 from the remote communication device 400 answering the call, has not been exchanged. For the call establish by means of the signals shown in FIG. 2, the dialog between the mobile device 200 and the remote communication device 400 is an early dialog, when the call is in the Pre-Alerting Call State or in the Alerting Call State.

While the present invention is described for a call session that assumes a Pre-Alerting Call State, an Alerting Call State and an Active Call State, the technique can readily be applied to a call assuming more or less than those three call states and to any other communication session that assumes two or more different session states.

With the completion of the transfer, the communication between the mobile device 200 and the network 300 is applied to a circuit-switched bearer 606, and the communication of the network component 340 towards the mobile convergence component 350 and the remote communication device 400 is applied to an IP bearer 608.

When the remote communication device 400 accepts the call, the signal communication 532 is triggered for changing the first call state 602 and the second call state 604 to the Active Call State. The final response signal 534 is provided by the remote communication device 400 to the mobile convergence component 350. The response 534 for the call invitation 502 is forwarded as final response signal 536 to the network component 340.

In the situation illustrated in FIG. 2, the transfer is completed prior to reception of the final response 534, which is why the mobile device 200 communicates via the circuit-switched connection 220. A connect message 538 as a circuit-switched signal indicative of the Active Call State is provided by the network component 340 to the mobile device 200. The mobile device 200 acknowledges the connect message 538 by sending an acknowledgement message 540 in the circuit-switched domain to the network component 340. The network component 340 acknowledges the final response 536 by sending an acknowledgment request 542, e.g. using an IP bearer 608, to the mobile convergence component 350. The acknowledgement request 542 is forwarded by the mobile convergence component 350 as acknowledgement request 544 towards the remote communication device 400.

As a result of the successful signal communications shown in FIG. 2, both the first call state 602 and the second call state 604 assume the Active Call State. However, at least some of the signals exchanged with the mobile device 200 prior to or during the transfer can be lost, i.e., a message relevant for the second call state 604 does not reach the mobile device 200 via the first RAT 310 and not via the second RAT 320. As a first potential reason, when the mobile device 200 moves away from the coverage provided by the first RAT 310, the radio link is already fading, so that one or more of the signals in the signal communication 501 can be lost on the first access leg 110 prior to the transfer. The transfer takes a certain minimum period of time, e.g., for the signal communication 527 within the telecommunications network 300 and towards the remote communication device 400. As a second potential reason, responses from the remote communication device 400, which are to be forwarded to the mobile device 200, can be lost in at least some instances of the transfer, e.g., due to a radio connection break during the SRVCC transfer. As a third potential reason, the forwarded response can be lost at the side of the mobile device 200, e.g., due to the switching from the first RAT connection 210 to the second RAT connection 220. Independent of the underlying detailed reasons, there is a significant rate of lost messages sent towards the mobile device 200 in the context of transfer.

The potential loss of a message at the radio interface is not limited to signals of the initial signal communication 501. Depending on the relative timing between the transfer and the session states changing during session setup, packet-switched messages 539 and 541 (corresponding to the circuit-switched signals 538 and 540, respectively) exchanged during the signal communication 532 for session activation can also be lost, as discussed below with reference to FIG. 4. For example, if the SIP 200 OK final response signal from the remote communication device 400 reaches the SCC-AS 354, but does not reach the mobile device 200, the first call state 602 at the side of the telecommunications network 300 and the second call state 604 at the side of the mobile device 200 can become inconsistent.

To tackle a possible incompatibility of call states between the mobile device 200 and the MSC server as an example of the network component 340, standard specification 3GPP TS 24.237 recommends in Clause 12.6.3 that the MSC server verifies the call state using the Status Enquiry procedure in accordance with further standard specification 3GPP TS 24.008. If the call states 602 and 604 are incompatible, standard specification 3GPP TS 24.237 requires that the transferred session be released. For example, if the first call state 602 is the Active Call State and the Status Enquiry reveals that the second call state 604 is the Alerting Call State (i.e., call delivered state), the MSC server 340 will release the call transferred by the SRVCC procedure.

As a consequence, a high failure rate of SRVCC transfers can occur for calls in Pre-Alerting or Alerting Call State.

The Pre-Alerting Call State encompasses the time after exchanging the invitation 502 for the call and prior to exchanging the ringing response 508. Support for SRVCC transfer in the Pre-Alerting Call State is expected for Release 12 of the standard specification 3GPP. A mobile device 200 according to Release 11 of the 3GPP standard specification releases the call, if the SRVCC transfer occurs before receiving the ringing response 508 indicating the Alerting Call State. In other words, a mobile device 200 according to Release 11 of the 3GPP standard specification releases the session for a call to be transferred in the Pre-Alerting Call State.

Figure 3:
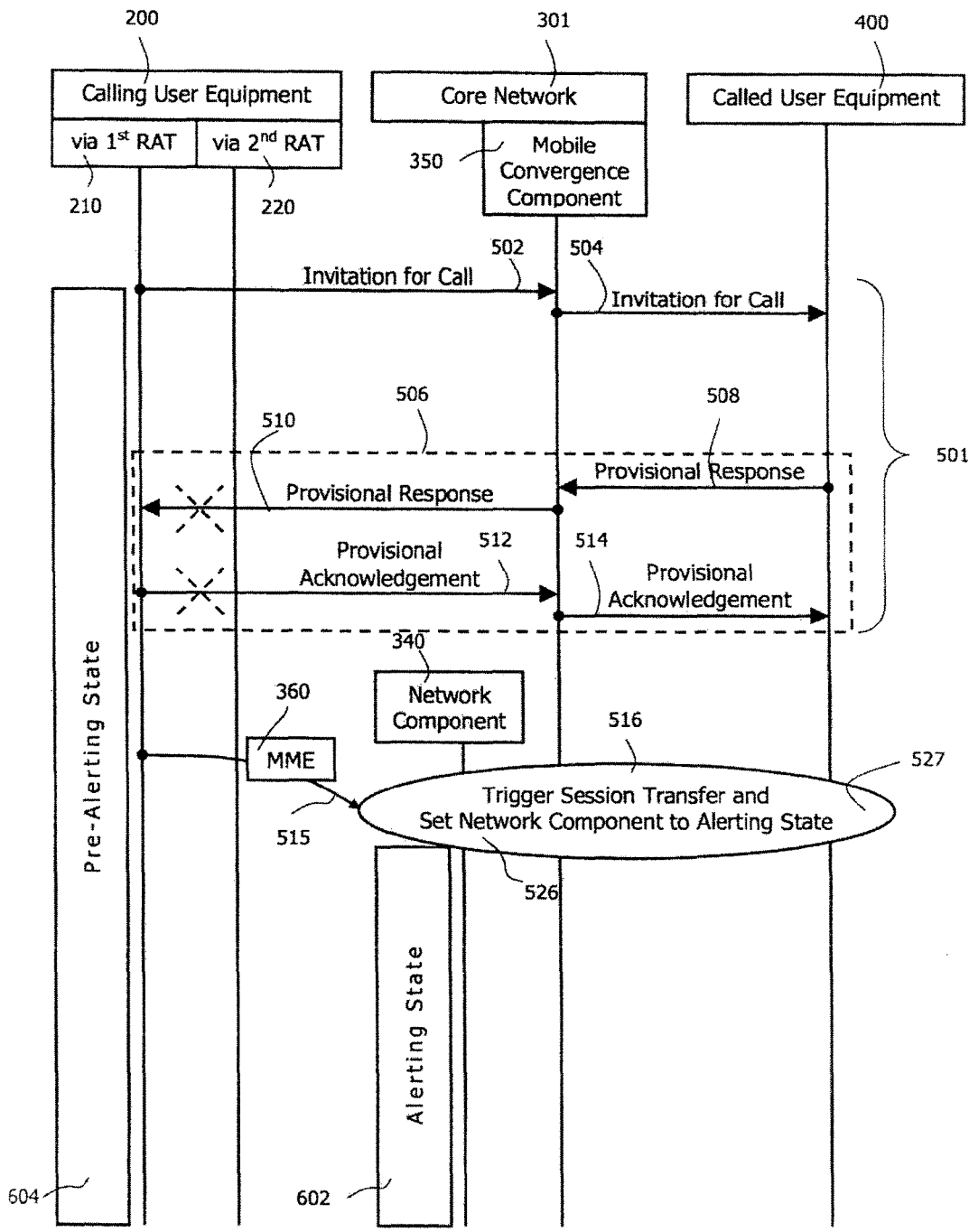
FIG. 3 shows a signaling diagram for a first case of signal loss.

FIG. 3 shows a signaling diagram 610 that schematically illustrates a first case of inconsistent call states. The signal communication 501 mentioned above in the context of FIG. 2 is shown in more detail in FIG. 3. The invitation 502 for the call is transmitted from the mobile device 200 via the first wireless connection 210 using the first RAT 310 to the core network 301 of the telecommunications network 300. The mobile convergence component 350 in the core network 301 successfully forwards the invitation 502 as invitation request 504 to the remote communication device 400. The call (also referred to as a speech session) has been anchored at the mobile convergence component 350 (e.g., by the SCC-AS 354). Both the mobile device 200 and the remote communication device 400 have reserved resources due to early media generation.

The mobile device 200 sends a measurement report indicating a fading radio link to the Radio Access Network (RAN) implementing the first RAT 310. From the point of view of session transfer, the first RAT 310 is implemented by the source RAN. The source RAN decides to trigger the SRVCC transfer to the second RAT 320.

In the situation of fading radio connection via the first RAT 310, e.g., at approximately the same time of sending the measurement report, the mobile convergence component 350 receives in a signal communication 506 a provisional response 508 that optionally requires (in the case of a reliable provisional response) a provisional acknowledgement 512. The provisional response 508 can be a ringing response or any other response relevant for the session state. A corresponding provisional response message 510 is derived from the provisional response 508 and sent towards the mobile device 200, but the message 510 does not reach the mobile device 200, e.g., either because the message 510 is lost prior to or during the transfer or because the mobile device 200 has proceeded with the handover from the first RAT connection 210 to the second RAT connection 220. Consequently, the provisional acknowledgement 512 is not sent by the mobile device 200 and no provisional acknowledgement 514 is forwarded by the mobile convergence component 350 to the remote communication device 400.

Based on the decision of the RAN implementing the first RAT 310, a Mobility Management Entity (MME) 360 provides a trigger 515 for initiating the transfer as described above for the signal communication 516. The network component 340 is set to the Alerting Call State as the first call state 602 in accordance with the provisional response 508 from the remote communication device 400, as described above for the signal communication 526.

As a result, the first call state 602 is in the Alerting Call State and the second call state 604 of the mobile device 200 is still in the Pre-Alerting Call State.

According to standard specification 3GPP TS 24.237, the MSC server 340 sends a Status Enquiry request to verify the second call state 604 of the mobile device 200. The mobile device 200 sends a Status response indicating the Pre-Alerting Call State (also referred to as mobile originating call proceeding state). When the MSC server 340 detects the incompatibility, the MSC server 340 shall clear the call by sending a Release Complete message according to Clause 12.6.3 of standard specification 3GPP TS 24.237. In the absence of any alerting indication at the mobile device 200 prior to the remote communication device 400 answering the call, the mobile device 200 may disconnect the call and the local user of the mobile device 200 will not hear any ringing tone, each of which is a negative user experience.

Figure 4:
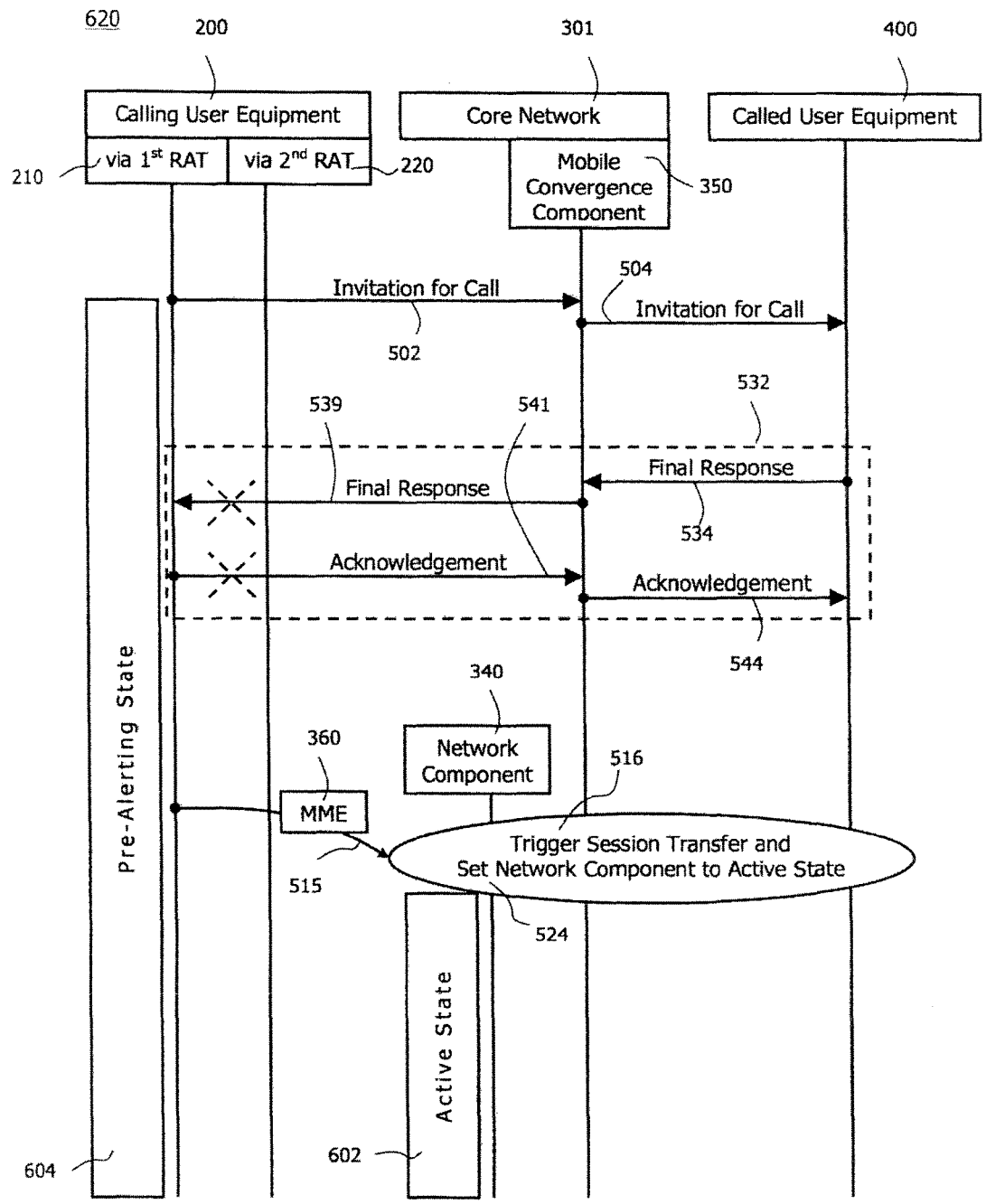
FIG. 4 shows a signaling diagram for a second case of signal loss.

FIG. 4 shows a signaling diagram 620 schematically illustrating a second case of signal communication leading to inconsistent call states 602 and 604. In this case, a provisional ringing response is not used during session setup. The final response signal 534 is forwarded as a final response message 539 towards the mobile device 200 by the mobile convergence component 350. Both the connect message 538 described with reference to FIG. 2 for the first case and the final response message 539 sent in the second case shown in FIG. 4 indicate to the mobile device 200 the Active Call State, i.e., that the remote communication device 400 has answered the call. The messages 538 and 539 differ in that the message 538 is a circuit-switched message sent via the circuit-switched bearer 606, whereas the message 539 is sent in the packet-switched domain 110 (e.g., prior to completion of the transfer from the first RAT 310 in the packet-switched domain to the second RAT 320 in the circuit-switched domain).

The message 539 sent towards the mobile device 200 is lost at the radio interface. The network component 340 triggers the session transfer for the session when receiving the trigger 515. As the mobile convergence component 350, e.g., the SCC-AS 354, has received the final response signal 534 to the invitation 504, the mobile convergence component 350 knows that the call is in the Active Call State and informs the network component 340 by means of the final response signal 524 accordingly. The final response signal 524 may be an SIP 200 OK final response signal directly replied to the network component 340 in response to the invitation signal 516 from the network component 340 for triggering the session transfer.

Upon receiving the final response message 524 to the invitation 516 for transfer, the network component 340 acknowledges the message 524 to the mobile convergence component 350 and the first call state 602 of the network component 340 is set to the Active Call State. Since the final response message 539 is lost at the radio interface, the mobile device 200 is still in the Pre-Alerting Call State, also after successfully performing the transfer from the first RAT 310 to the second RAT 320.

As a consequence of the inconsistent call states 602 and 604, standard specification 3GPP TS 23.237 (which is expected to support in Release 12 the transfer in the Pre-Alerting Call State) requires the MSC server 340 to clear the call by sending a Release Complete message in response to the state inconsistency.

Figure 5:
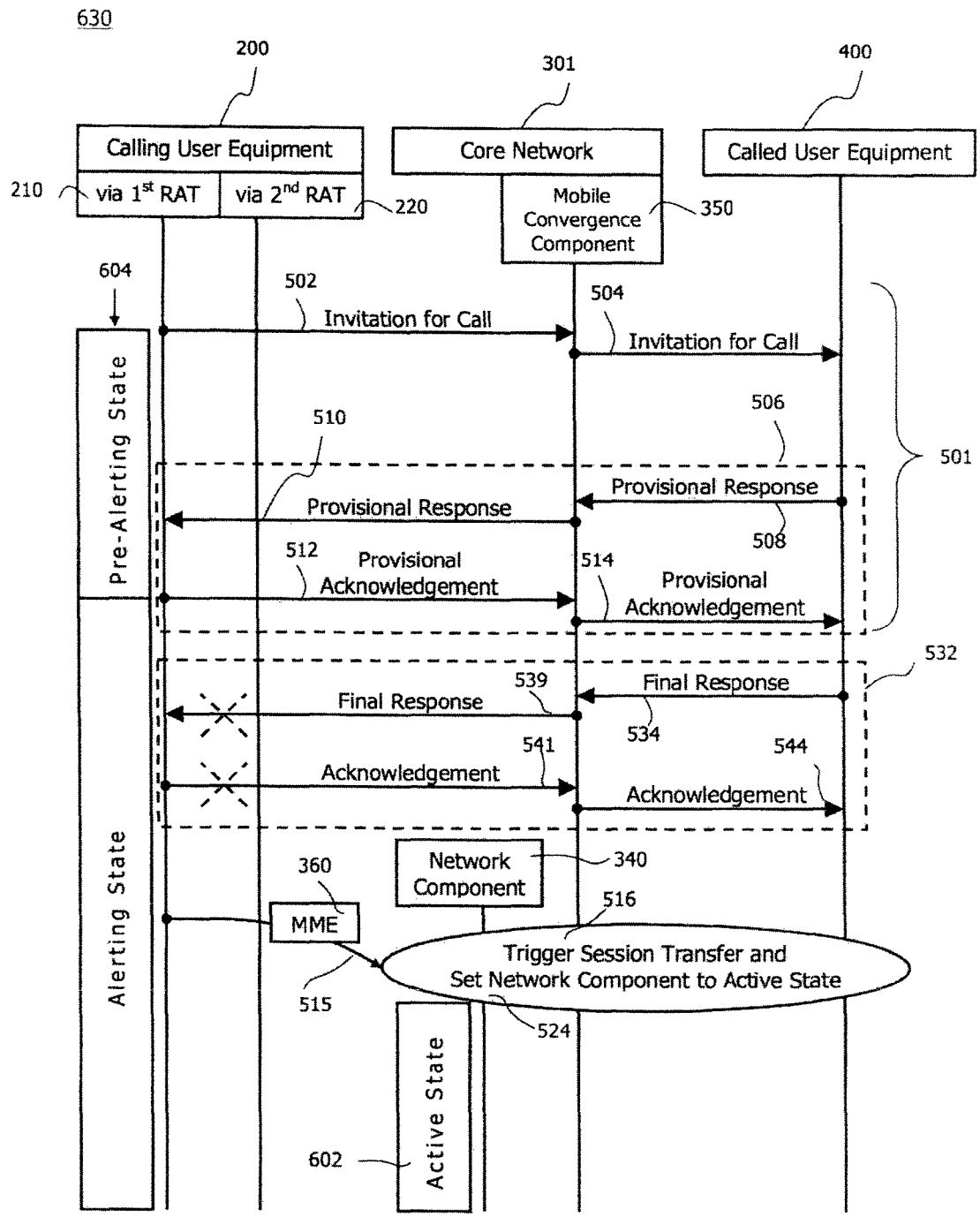
FIG. 5 shows a signaling diagram for a third case of signal loss.

FIG. 5 shows a signaling diagram 630 schematically illustrating a third case of a signal loss leading to inconsistent call states 602 and 604. By means of the initial signal communication 501, the mobile device 200 initiates a speech session for the call, which is anchored at the mobile convergence component 350, e.g., at the SCC-AS 354. The subsequent signal communication 506 includes the provisional response 508 from the remote communication device 400, which is received at the mobile convergence component 350. Upon reception of the provisional response 508, the telecommunications network 300 considers the call in the Alerting Call State. The provisional response 510 for inducing the Alerting Call State is forwarded to the mobile device 200. Upon receiving the provisional response 510, upon providing the provisional acknowledgement 512 or at any point in time there inbetween, the second call state 604 of the mobile device 200 is changed from the Pre-Alerting Call State to the Alerting Call State.

The final response 539 is lost in the signal communication 532, as described in the context of the signaling diagram 620. The third case of signal loss according to the signaling diagram 630 differs from the second case according to the signaling diagram 620 in that the signal loss and the transfer occur while the mobile device 200 is in the Alerting Call State.

The transfer is initiated by the network component 340 and the first call state 602 of the network component 340 is set to the Active Call State in accordance with the final response 534 of the remote communication device 400. Since the mobile device 200 does not receive the final response message 539 derived from the final response 534, the second call state 604 of the mobile device 200 remains in the Alerting Call State. Consequently, the loss of the final response message 539 leads to an inconsistency between the first call state 602 and second call state 604.

While the occurrence of the trigger 515 and the loss of the message (indicated by crosses of dashed lines) are shown in temporal separation in FIGS. 3 to 5 for clarity, it is to be emphasized that in any of the cases illustrated in FIGS. 3 to 5 the loss of the message that would have been relevant for updating the second call state 604 of the mobile device 200 and the trigger 515 for the transfer can occur subsequently or at least substantially at the same time. For example, the loss of the message can occur prior to the trigger 515 or the trigger 515 can occur prior to the loss of the message, e.g., depending on the reason for the loss.

As pointed out above, the standard behavior suggests a release of the session in response to the state inconsistency.

Figure 6:
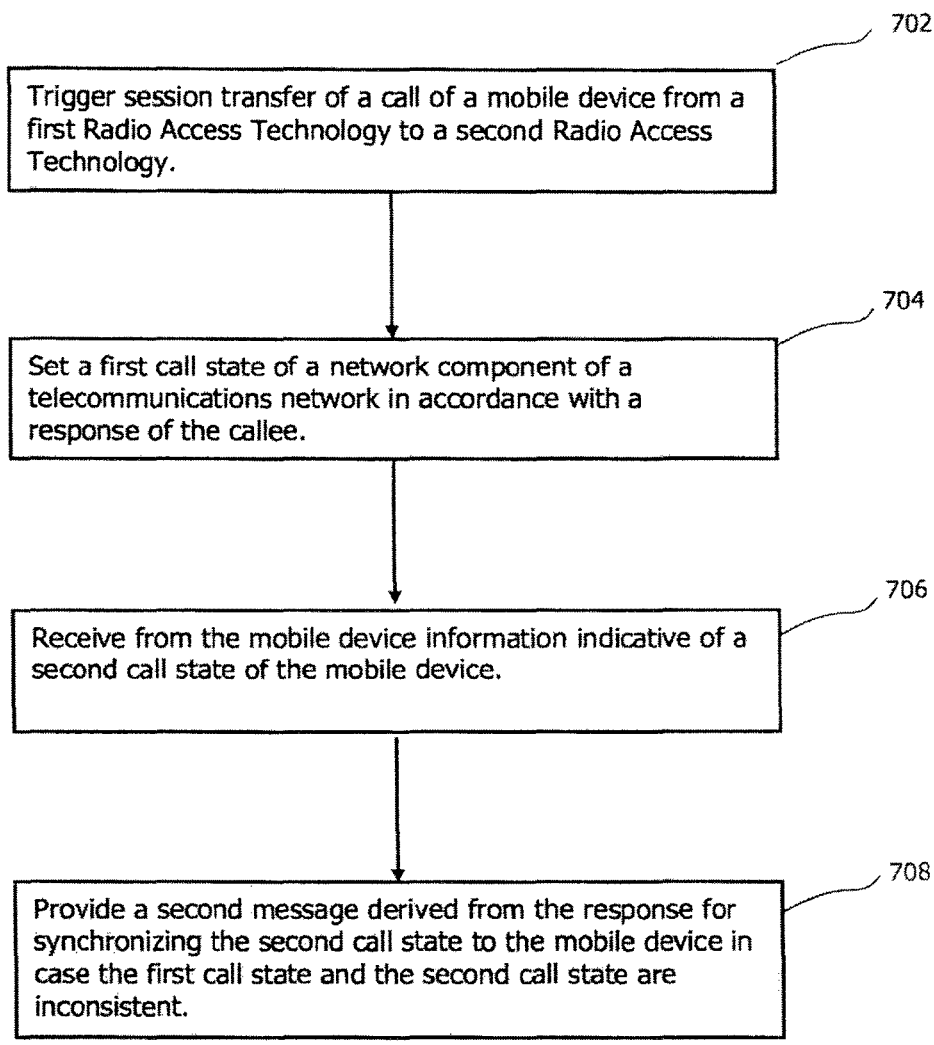
FIG. 6 shows a flow chart of a method embodiment executable by the network component shown in FIG. 1.

To solve the problem of session release during session setup, FIG. 6 shows a flow chart 700 of a method embodiment for synchronizing a first call state of a network component of a telecommunications network and a second call state of a mobile device that is connectable to the telecommunications network via a first RAT and a second RAT. The telecommunications network is configured to forward towards a callee an invitation for a call originating via the first RAT from the mobile device and to send a first message derived from a response of the callee towards the mobile device. In a step 702, a session transfer of the call of the mobile device from the first RAT to the second RAT is triggered.

The first call state of the network component of the telecommunications network is set in accordance with the response of the callee in a step 704 of the method 700. Information indicative of the second call state of the mobile device is received from the mobile device in a step 706. A second message derived from the response of the callee is provided to the mobile device in case the first call state and the second call state are inconsistent according to step 708 of the method 700.

The method 700 can be implemented in the network component 340, for example within the telecommunications network 300 shown in FIG. 1. To this end, the network component 340 includes a triggering unit 342, a setting unit 344, a receiving unit 346, and a providing unit 348 adapted to perform the steps 702 to 708, respectively. The mobile device 200 can be the mobile device functioning as the caller. The remote communication device 400 can be the callee.

The triggering of the transfer according to the step 702 can be implemented by sending the invitation signal 518 described above with reference to any one of the signaling diagrams 600, 610, 620 and 630.

Setting the first call state in accordance with the response of the callee, in the step 704, can be based on the provisional response 508 or the final response 534. The first call state 602 of the network component 340 can be set in accordance with a call state implied by the message received at the network component 340 from the mobile convergent component 350. The message can be the final response message 524 based on the final response 534 or the information message 528. The network component 340 is not involved in the call prior to the transfer.

The information indicative of the second call state 604 can be received in the step 706 in response to sending a Status Enquiry message towards the mobile device 200. The network component 340 queries and receives the second call state 604 after the transfer. The information indicative of the second call state 604 is received by means of the second RAT 320. Optionally, the network component only queries the second call state, if the network component receives the indication, e.g., from the mobile convergence component, of the Active Call State or the Alerting Call State during the transfer.

The second message provided to the mobile device 200 in the step 708 is sent in addition to the first message previously sent towards the mobile device 200. The first message sent towards the mobile device, e.g., the provisional response message 510 or the final response message 539, is sent using the first RAT 310 (i.e., via the first access leg 110). The second message provided in the case of inconsistent call states is provided after the transfer using the second RAT 320 (i.e., via the second access leg 120). The derivation of the second message provided to the mobile device 200 in the case of inconsistent call states 602 and 604 includes a mapping of the response from the remote communication unit 400 to messages exchangeable by the second RAT 320. For example, the response from the remote communication unit 400 can fulfill a communication protocol of the IP bearer 608 and the message provided to the mobile device 200 according to the step 708 can fulfill a communication protocol of the circuit-switched bearer 606. The second message is configured to set the second call state in consistency with a call state implied by the response.

Figure 7:
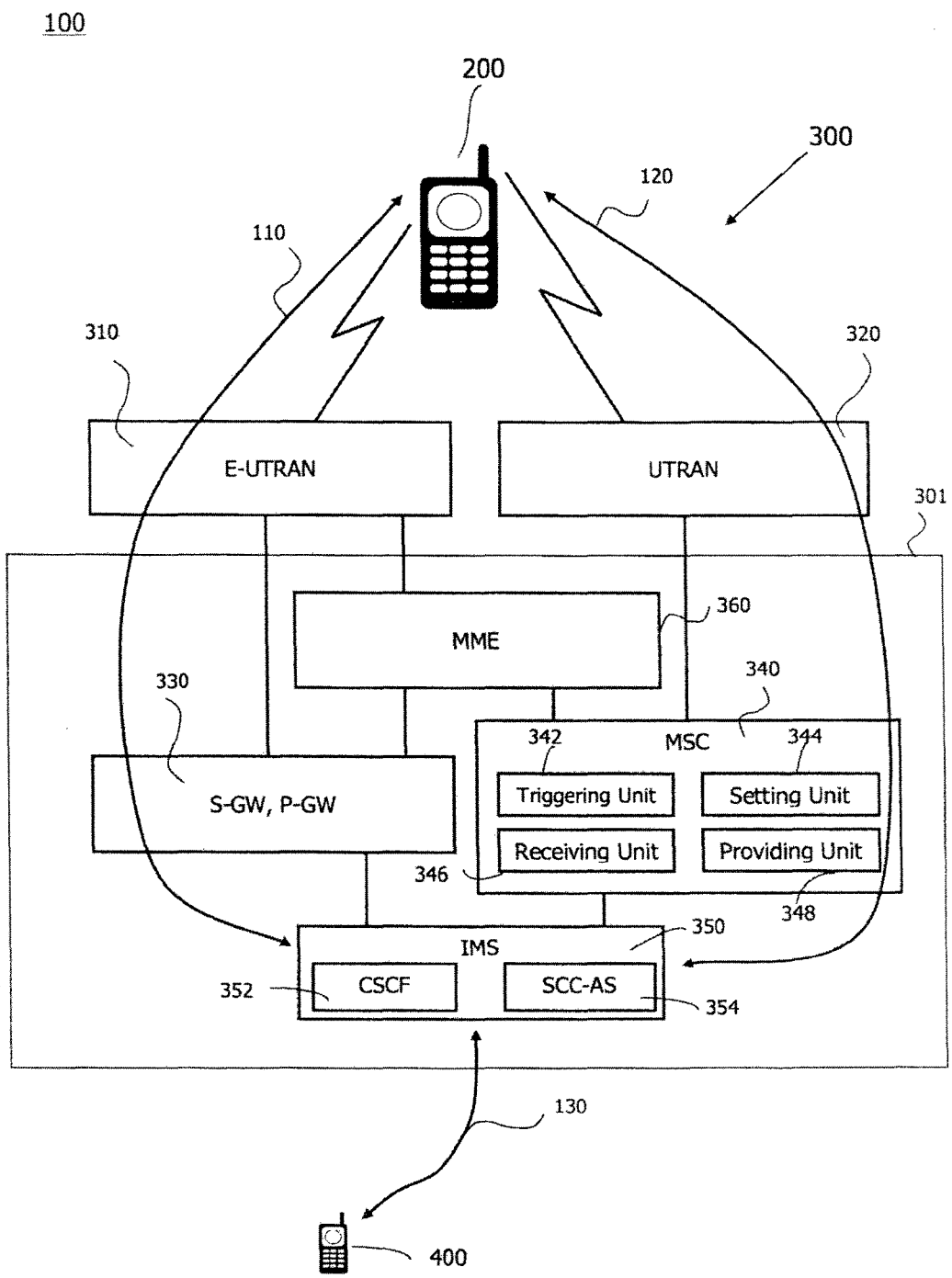
FIG. 7 schematically illustrates in more detail the mobile telecommunications system of FIG. 1 including an embodiment of the telecommunications network and an embodiment of the network component therein.

FIG. 7 schematically illustrates a more detailed implementation of the communication system 100. The first RAT 310 is implemented in accordance with evolved UMTS Terrestrial Radio Access (E-UTRA). The E-UTRAN implementing the first RAT 310 is coupled to the gateway component 330. The gateway component 330 includes a Serving Gateway (S-GW) and a Packet Data Technology Gateway (P-GW). The S-GW is responsible for handovers with neighboring base stations (eNodeB) and for data transfer across a user plane. The P-GW provides a link between the E-UTRAN 310 and services that reside in an external packet network, such as the mobile convergence component 350 implemented by an IP Multimedia Subsystem (IMS). The P-GW allocates a dynamic IP address for the mobile device 200 and routes the user plane packets. The first access leg 110 is thus fully implemented in the packet-switched domain. Messages exchanged via the first access leg 110 for establishing the call apply the Session Initiation Protocol (SIP). The SIP is a signaling protocol defined by the Internet Engineering Task Force (IETF).

The second access leg 120 includes the UMTS Terrestrial Radio Access Network (UTRAN) implementing the second RAT 320. A Mobile-services Switching Center (MSC) implements the network component 340. The MSC 340 routes voice calls and Short Message Services (SMS) as well as other services such as conference calls, facsimile and circuit-switched data. The MSC 340 thus provides the circuit-switched bearer 606 via the second access leg 120.

The IMS 350 includes Call Session Control Functions (CSCF) 352 and the Service Centralization and Continuity (SCC) Application Server (AS) 354. The IMS 350 has no direct connection to either of the two Radio Access Networks. The indirect connection towards the mobile device 200 using LTE as the first RAT 310 is via the Evolved Packet Core (EPC) network. The indirect connection towards the mobile device 200 using GERAN or UTRAN is via the Circuit Switched (CS) network. The MSC 340 is part of the Circuit Switched (CS) network. The term Core Network 301, as used herein, includes both the EPC network and the CS network.

Figure 8:
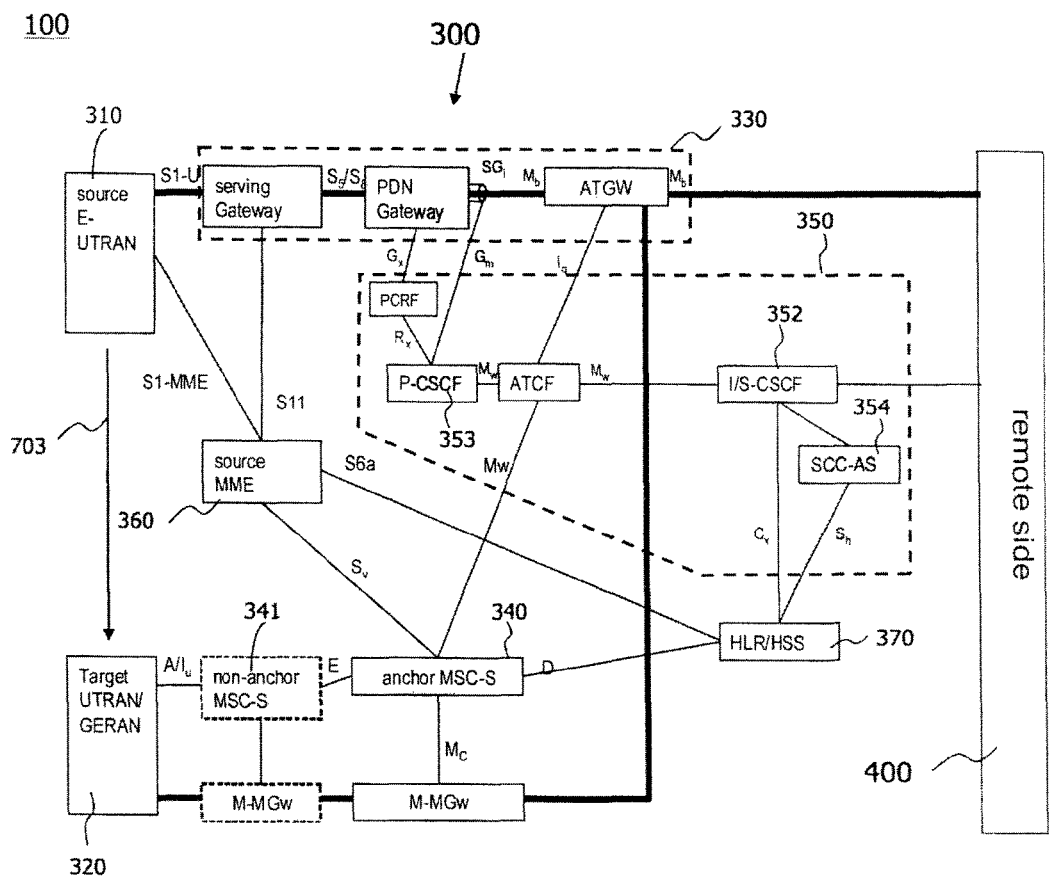
FIG. 8 schematically illustrates in more detail the telecommunications network shown in FIG. 7.

FIG. 8 schematically illustrates further details of the communication system 100. The transfer 703 from the first RAT 310 to the second RAT 320 is indicated by an arrow. For the clarity of the illustration, nodes that are not necessarily involved in media streaming management and interworking with other networks are not shown in the network diagram of FIG. 8. Bold lines represent the media stream connections. Thin lines represent signaling interfaces.

The MSC 340 is a switching node for circuit-switched data in the GSM and UMTS domain. Different MSCs 340, 341 are responsible for different geographic areas. Since Release 4, the MSC is split in the subcomponents MSC server and media gateway (M-M Gw). The term MSC as used herein thus encompasses the MSC server. Nodes indicated by dashed lines are only involved in the SRVCC procedure in case an inter-MSC handover occurs at the same time. At least in some implementations of the telecommunications network 300, the technique can be implemented in the anchoring MSC 340.

In addition to the S-GW and the P-GW, the gateway component 330 further includes an Access Transfer Gateway (ATGW). The IMS 350 further includes an Access Transfer Control Function (ATCF).

The Call Session Control Functions (CSCF) include a proxy functionality (P-CSCF) 353. The ATCF is co-located with the P-CSCF 353 and coupled to the ATCF via an interface Mw. The interface between the ATCF and the ATGW is Iq according to standard specification 3GPP TS 23.334 (e.g., Version 11.2.0). The telecommunications network 300 further includes a Home Subscriber Server (HSS) 370. The subscription information STN-SR included in the invitation message 518 for the transfer 703 is provided to the HSS 370. The SCC-AS 354 correlates the transfer request with the anchored session using information provided in the incoming invitation message 518 and correlates the second access leg 120, which is created responsive to the transfer update message in the signal communication 520 from the ATCF, with the remote leg 130. The SCC-AS 354 uses an interface ISC towards the S-CSCF 352 for execution of the transfer 703. Each of the interfaces Mw and ISC applies the SIP as the communication protocol.

Figure 9:
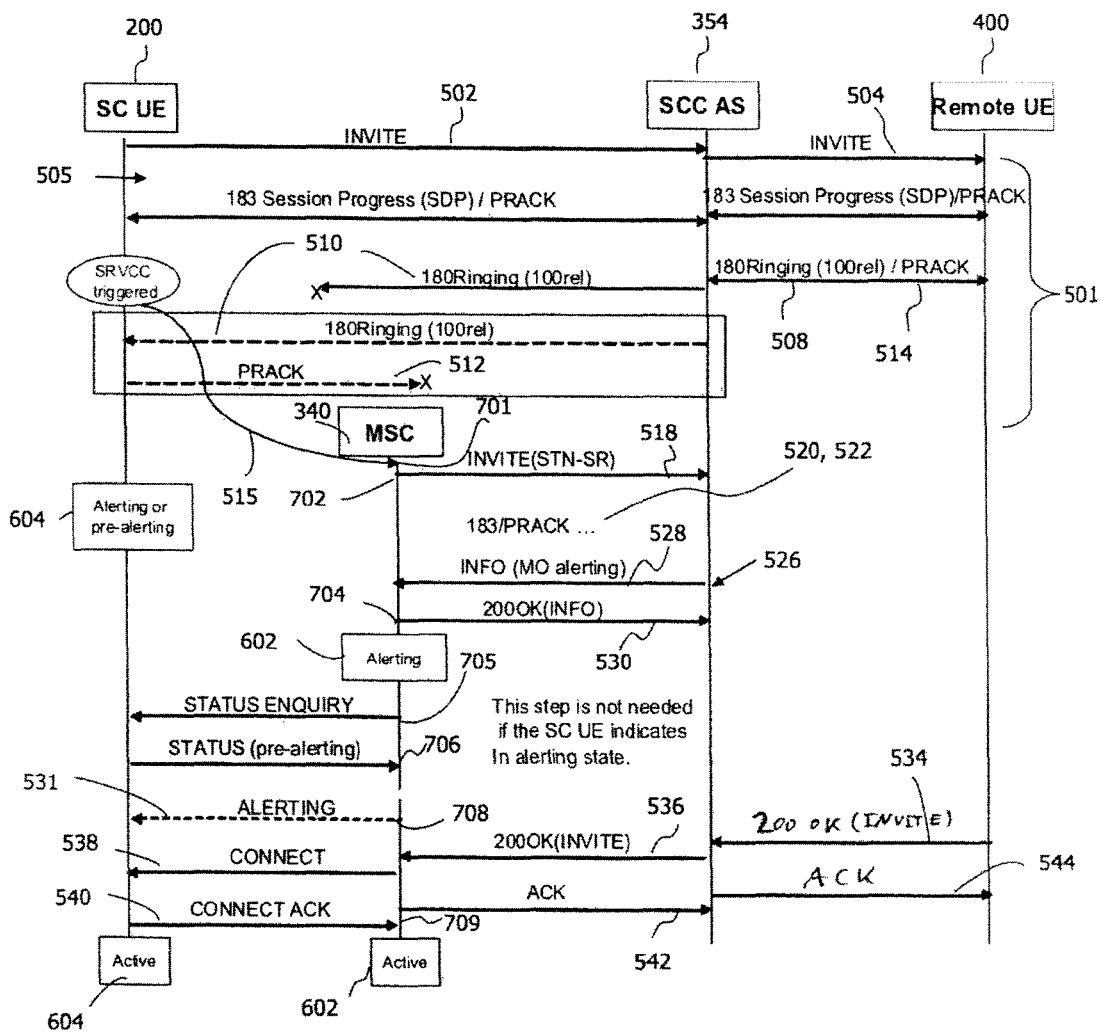
FIG. 9 shows a first signaling diagram for signals exchanged in the mobile telecommunications system of FIG. 1 according to the method embodiment of FIG. 6 and the device embodiments of FIGS. 7 and 8.

FIG. 9 shows a signaling diagram 710 resulting from a first implementation of the method 700 in the network component 340. The situation illustrated in the signaling diagram 710 corresponds to the first case described with reference to the signaling diagram 610 and provides further details for an implementation using the SIP as the communication protocol.

The mobile device 200 initiates a speech session, which has been anchored by the SCC-AS 354. An early dialog is established by the signal communication 501, which mandatorily includes the SIP INVITE message 502 from the mobile device 200 and forwarded by the SCC-AS 354 as SIP INVITE message 504. The signal communication 501 optionally includes the reception of an SIP 183 session progress provisional response from the remote communication device 400 at the SCC-AS 354 that is forwarded to and acknowledged by the mobile device 200 in signal communication 505.

As or after the mobile device 200 triggers the SRVCC handover, the SIP 180 ringing response 508 is received by the SCC-AS 354 that sends the corresponding message 510 towards the mobile device 200. In this first case, either the preliminary response message 510 or the corresponding preliminary acknowledgement message 512 (as indicated by dashed arrows) is lost at the radio interface. Consequently, the SCC-AS 354 is aware of the call being in the Alerting Call State as the first call state 602, whereas the mobile device 200 considers the call to be in the Alerting or Pre-Alerting Call State as the second call state 604 depending on whether the SIP 180 ringing response 510 has been received or not, respectively.

For SRVCC from the E-UTRAN 310 to UTRAN or GERAN implementing the second RAT 320, the MME 360 receives the handover request from the E-UTRAN implementing the first RAT 310 with an indication that the handover is for SRVCC handling and then sends the trigger 515 to the MSC 340 enhanced for SRVCC via the interface Sv, if the MME 360 has the STN-SR information for the mobile device 200.

The MSC 340 receives in a further step 701 of the method 700 the trigger 515 for transfer. According to the step 702, the MSC 340 sends the SIP INVITE message 518 for initiating the session transfer procedure to the IMS 350 and coordinates the session transfer procedure with the circuit-switched handover procedure to the target cell. Standard specification 3GPP TS 23.216 provides high-level concepts for the SRVCC transfer 703 in Clause 4.2.2.

When the SCC-AS 354 receives from the MSC 340 the SIP INVITE message 518 due to the STN-SR for session transfer, the SCC-AS 354 has received the SIP 180 ringing response 508 from the remote communication device 400 and has entered the Alerting Call State. Consequently, the SCC-AS 354 sends the SIP INFO request message 528 indicating that the call is a mobile originating alerting call to the MSC 340. At this moment, the SIP 200 OK final response 534 has not yet been received at the SCC-AS 354.

Upon receiving the message 528, the MSC 340 is set to the Alerting Call State 602 according to the step 704. The MSC 340 acknowledges the reception of the call state information message 528 by sending the SIP 200 OK message 530 to the SCC-AS 354. The reception of the information message 528 further triggers sending the Status Enquiry to the mobile device 200 according to a further step 705 of the method 700. In the step 706, status information is received from the mobile device 200.

If the mobile device 200 indicates the Pre-Alerting Call State in the status information message received in the step 706, the MSC 340 sends an alerting message 531 to the mobile device 200 according to the step 708. The alerting message 531 is configured to induce a change of the second call state 604 to the Alerting Call State. The alerting message 531 is thus indirectly derived from the ringing response message 508 using the first call state 602. If the mobile device 200 indicates the Alerting Call State in the status information message received in the step 706, the MSC 340 does not send the alerting message 531 to the mobile device 200. As a result, the first call state 602 and the second call state 604 are synchronized to the Alerting Call State.

The mobile device 200 generates a local ringing tone, if the mobile device 200 is not adapted to receive a network-generated ringing tone as early media. If the mobile device is adapted to receive the network-generated ringing tone as early media, the mobile device does not generate the local ringing tone when receiving the alerting message 531. As a result, the mobile device 200 behaves in accordance with the synchronized call states.

Subsequently or at a significantly later time, the SIP 200 OK final response message 534 is received from the remote communication device 400 by the SCC-AS 354 and forwarded as the SIP 200 OK final response message 536 to the MSC 340. The MSC 340 sends the connect message 538 to the mobile device 200. The mobile device 200 sends, in response to receiving the connect message 538, the connect acknowledgment message 540, which is forwarded as the SIP acknowledgement message 542 and the SIP acknowledgement message 544 towards the remote communication device 400. Consequently, both the first call state 602 and the second call state 604 are in the Active Call State. In a variant, the SCC-AS 354 directly replies an SIP ACK message 544 upon receiving the SIP 200 OK final response 534 without waiting for the ACK message 542 from MSC 340 in sequence.

Figure 10:
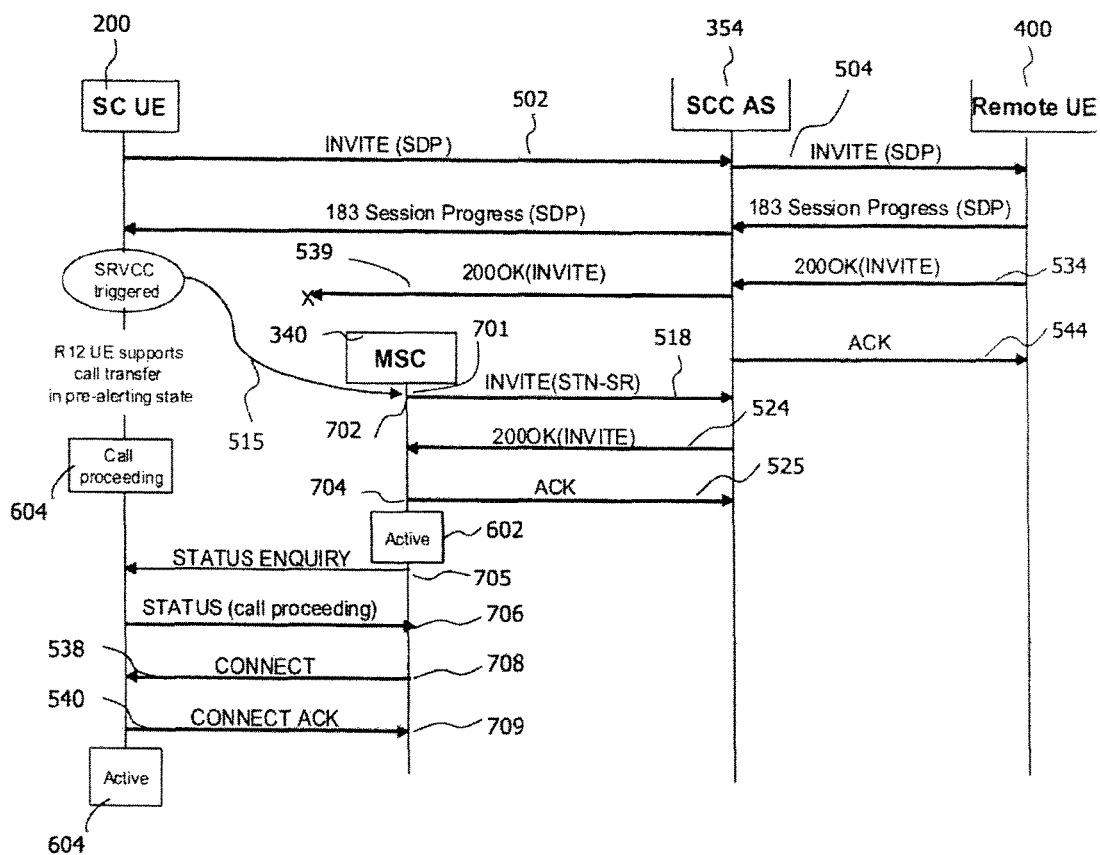
FIG. 10 shows a second signaling diagram for signals exchanged in the mobile telecommunications system of FIG. 1 according to the method embodiment of FIG. 6 and the device embodiments of FIGS. 7 and 8.

FIG. 10 shows a signaling diagram 720 resulting from an embodiment of the method 700 implemented in the network component 340. The situation shown in the signaling diagram 720 provides further details of the second case described with reference to the signaling diagram 620 and illustrates the synchronization of the temporarily inconsistent call states 602 and 604. The SRVCC transfer occurs in the mobile originating Pre-Alerting Call State. The SIP 200 OK final response message 539 is lost and an SIP 180 provisional response indicative of ringing is not used. The session setup thus transitions from the Pre-Alerting Call State directly to the Active Call State.

The MSC 340 receives the trigger 515 for SRVCC transfer in the step 701 and triggers the transfer according to the step 702 by sending the SIP INVITE message 518.

When the SCC-AS 354 receives the SIP INVITE message 518 due to the STN-SR for session transfer from the MSC 340, the SCC-AS 354 has sent the SIP 200 OK final response message 539 towards the mobile device 200. But the SIP 200 OK final response message 539 does not reach the mobile device due to radio break during the SRVCC handover. Consequently, the mobile device 200 is in the Pre-Alerting Call State when the transfer 703 to the circuit-switched domain using the second RAT 320 is completed.

The SCC-AS 354 regards the call in the Active Call State due to the SIP 200 OK final response message 534 received from the remote communication device 400. The SCC-AS 354 directed replies with the SIP 200 OK final response message 524 to the SIP INVITE message 518 for session transfer from the MSC 340. The first call state 602 is thus set to the Active Call State in the step 704 prior to or upon sending a SIP acknowledgement message 525 responsive to the message 524. Consequently, the first call state 602 is in the Active Call State, and the second call state 604 is in the Alerting Call State.

In the step 705, the MSC 340 sends the Status Enquiry message to the mobile device 200. In the step 706, the MSC 340 receives the Status response indicating the second call state 604 as Pre-Alerting Call State (also indicated as "mobile originating call proceeding state").

Instead of releasing the call in view of the state inconsistency, the MSC 340 sends the Connect message 538 to the mobile device 200 in the step 708 to indicate that the call is accepted by the remote communication device 400. The provided message 538 thus corresponds to the previously received final response message 534 as to the implied call state.

Upon receiving the Connect Acknowledgement message 540 in the step 709, the call transfer is successfully completed, and both the mobile device 200 and the MSC 340 have entered the Active Call State for the transferred call.

Figure 11:
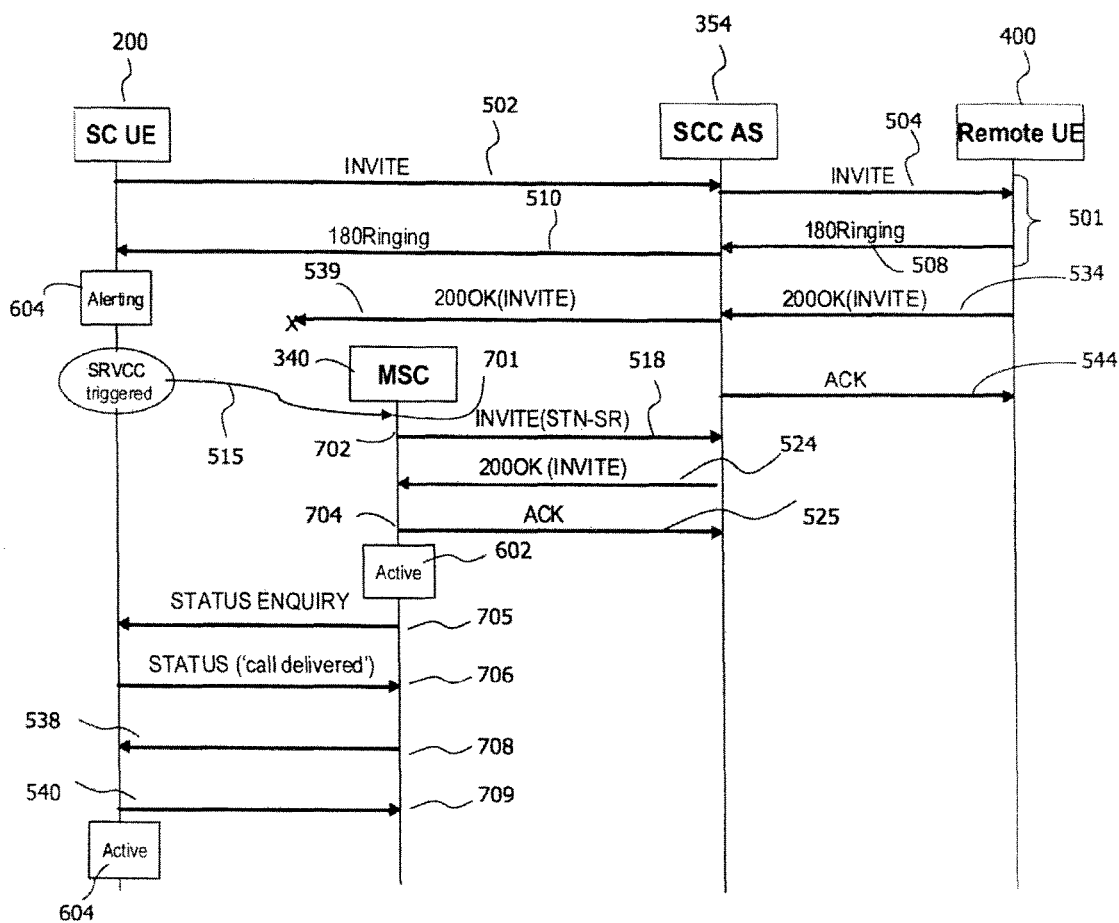
FIG. 11 shows a third signaling diagram for signals exchanged in the mobile telecommunications system of FIG. 1 according to the method embodiment of FIG. 6 and the device embodiments of FIGS. 7 and 8.

FIG. 11 shows a signaling diagram 730 schematically illustrating signals exchanged according to an embodiment of the method 700 performed by the MSC as exemplary implementation of the network component 340. The situation illustrated in the signaling diagram 730 corresponds to the third case discussed with reference to the signaling diagram 630. The SRVCC transfer is performed in the mobile originating Alerting Call State and the SIP 200 OK message 539 is lost.

The MSC 340 receives the trigger 515 from the MME 360 indicating the SRVCC transfer in the step 701 of the method 700. In response to receiving the trigger 515, the MSC 340 sends the SIP INVITE message 518 for session transfer to the SCC-AS 354 according to the step 702.

When the SCC-AS 354 receives the SIP INVITE message 518 due to the STN-SR for session transfer, the SCC-AS 354 has received the SIP 200 OK message 534 from the remote communication device 400 and regards the call as being in the Active Call State. Consequently, the SCC-AS 354 directly replies with the SIP 200 OK final response message 524 to the SIP INVITE message 518. Based on the message 524, the first call state 602 is set in accordance with the response 534 of the callee 400 in the step 704. Consequently, the first call state 602 is in the Active Call State, while the second call state 604 is still in the Alerting Call State after the transfer 703.

Upon receiving the SIP 200 OK final response message 524, the MSC 340 sends the Status Enquiry message to the mobile device 200 in the step 705 to retrieve the second call state 604 of the mobile device 200.

If the Status response message received in the step 706 indicates that the second call state of the mobile device is the Alerting Call State (also referred to as "call delivered state"), the MSC 340 sends the Connect message 538 to the mobile device 200 in the step 708 to indicate to the mobile device 200 that the call is accepted by the remote communication device 400. The Connect message 538, which is provided in the step 708, is thus indirectly derived from the final response message 534 of the remote communication device 400.

Upon receiving a Connect Acknowledgement message 540 in the step 709 from the mobile device 200, the call transfer is successfully completed, and both the mobile device 200 and the MSC 340 have entered the Active Call State for the transferred call.

The technique described herein is not limited to the three cases of signal loss described with reference to the signaling diagrams 710, 720 and 730. The technique can be applied in the context of any transfer from the first RAT 310 to the second RAT 320 to remedy a loss of a response, which is relevant for the session state, from the remote communication device 400. The technique is also not limited to voice calls and can readily be applied to video calls and any other communication session involving two or more session states.

Whenever the information received in the step 706 indicates that the second call state 604 is outside a predefined set of states, the network component 340 clears the transferred session. For the exemplary embodiments described with reference to the signaling diagrams 710 to 730, the MSC 340 clears the call transferred by the SRVCC procedure by sending a Release Complete message to the mobile device 200, if the Status response message received in the step 706 indicates that the second call state 604 is other than the Pre-Alerting Call State (also referred to as "mobile originating call proceeding state"), the Alerting Call State (also referred to as "call delivered state") and the Active Call State.

As has become apparent from the above description of exemplary embodiments, by receiving information indicative of the second call state from the mobile device and providing a message to the mobile device corresponding to the call state implied in a recent response of the callee in case the first call state and the received second call state are inconsistent, the success rate for SRVCC transfer of calls in Pre-Alerting or Alerting Call State can be improved. The technique can improve the overall success rates for SRVCC transfer. For example, a user experience is improved, when Voice over LTE (VoLTE) is deployed in hotspot areas covered by the first Radio Access Technology.

Many advantages of the technique are readily understood by the skilled person from the foregoing description, and it will be apparent that various changes may be made to the exemplary embodiments as to assignment and distribution of functionalities between the different nodes in the telecommunications network and as to the topology of the telecommunications network without departing from the scope of the invention or without sacrificing all of its advantages. Because the invention can be varied in many ways, it will be recognized that the invention should be limited only by the scope of the following claims.

The invention claimed is:

1. A method of synchronizing a first call state of a network node of a telecommunications network and a second call state of a mobile device that is connectable to the telecommunications network by a first Radio Access Technology and a second Radio Access Technology, wherein the telecommunications network is configured to forward towards a callee an invitation for a call originating by the first Radio Access Technology from the mobile device and to send a first message corresponding to a response of the callee towards the mobile device by the first Radio Access Technology, the method comprising the steps performed by the network node of:
   setting the first call state in accordance with the response of the callee;
   receiving information indicative of the second call state from the mobile device; and
   providing to the mobile device by the second Radio Access Technology a second message for inducing a change of the second call state in accordance with the response in case the first call state and the second call state are inconsistent, wherein the first call state of the network node comprises a first status maintained at the network node of a session between the mobile device and the callee, and
   wherein the second call state of the mobile device comprises a second status maintained at the mobile device of the session between the mobile device and the callee.

2. The method of claim 1, further comprising the step performed by the network node of:
   triggering a transfer of the call from the first Radio Access Technology to the second Radio Access Technology.

3. The method of claim 2, wherein the sent first message is sent prior to, during or after the transfer.

4. The method of claim 2, wherein the transfer of the call from the first Radio Access Technology to the second Radio Access Technology is performed in an alerting state or a pre-alerting state of the call.

5. The method of claim 2, wherein the transfer of the call from the first Radio Access Technology to the second Radio Access Technology includes a transfer from a packet-switched domain using the first Radio Access Technology to a circuit-switched domain using the second Radio Access Technology.

6. The method of claim 5, wherein at least one of the invitation and the response are exchanged in the packet-switched domain.

7. The method of claim 5, wherein at least one of the invitation and the response are exchanged according to a Session Initiation Protocol (SIP).

8. The method of claim 7, wherein the response is received in an early dialog state of the SIP.

9. The method of claim 5, wherein the provided second message is provided in the circuit-switched domain.

10. The method of claim 1, wherein the network node includes a Mobile-services Switching Center (MSC) communicating towards the mobile device by the second Radio Access Technology.

11. The method of claim 10, wherein information as to the response for the setting of the first call state is received by the MSC from the IMS.

12. The method of claim 1, wherein the telecommunications network includes an Internet Protocol Multimedia Subsystem (IMS) selectively communicating towards the mobile device by the first Radio Access Technology and the second Radio Access Technology, and wherein the call is anchored at the IMS.

13. The method of claim 1, wherein states assumable by each of the first call state and the second call state include a Call Proceeding State, a Call Delivered State and an Active Call State.

14. The method of claim 13, wherein the network node provides a release message to the mobile device in case the received information indicative of the second call state indicates none of the Call Proceeding State, the Call Delivered State and the Active Call State.

15. A computer program product comprising a non-transitory computer readable storage medium storing program code for performing the steps of claim 1 when the program code is executed on one or more computing devices.

16. The method of claim 1, further comprising receiving, prior to a transfer, an indication of the transfer triggered by a measurement indicating that the mobile device moves out of a coverage region of the first Radio Access Technology.

17. A method of synchronizing a first call state of a network node of a telecommunications network and a second call state of a mobile device that is connectable to the telecommunications network by a first Radio Access Technology and a second Radio Access Technology, wherein the telecommunications network is configured to forward towards a callee an invitation for a call originating by the first Radio Access Technology from the mobile device and to send a first message corresponding to a response of the callee towards the mobile device by the first Radio Access Technology, the method comprising the steps performed by the network node of:
  setting the first call state in accordance with the response of the callee;
  receiving information indicative of the second call state from the mobile device; and
  providing to the mobile device by the second Radio Access Technology a second message for inducing a change of the second call state in accordance with the response in case the first call state and the second call state are inconsistent,
  wherein the network node receives, prior to a transfer, an indication of the transfer triggered by a measurement indicating that the mobile device moves out of a coverage region of the first Radio Access Technology.

18. A network node for synchronizing a first call state of the network node of a telecommunications network and a second call state of a mobile device that is connectable to the telecommunications network by a first Radio Access Technology and a second Radio Access Technology, wherein the telecommunications network is configured to forward towards a callee an invitation for a call originating by the first Radio Access Technology from the mobile device and to send a first message corresponding to a response of the callee towards the mobile device by the first Radio Access Technology, the network node comprising a processor configured to:
  set the first call state in accordance with the response of the callee;
  receive information indicative of the second call state from the mobile device; and
  provide to the mobile device by the second Radio Access Technology a second message for inducing a change of the second call state in accordance with the response in case the first call state and the second call state are inconsistent,
  wherein the first call state of the network node comprises a first status maintained at the network node of a session between the mobile device and the callee, and
  wherein the second call state of the mobile device comprises a second status maintained at the mobile device of the session between the mobile device and the callee.

19. The network node of claim 18, wherein the network node is located in the telecommunications network.

20. The network node of claim 18, wherein the network node is located in a Mobile-services Switching Center (MSC) of the telecommunications network.

21. A telecommunications network comprising:
  an Internet Protocol Multimedia Subsystem (IMS) adapted to anchor a call; and
  a Mobile-services Switching Center (MSC) including a network node according to claim 18.

22. The network node of claim 18, wherein the network node receives, prior to a transfer, an indication of the transfer triggered by a measurement indicating that the mobile device moves out of a coverage region of the first Radio Access Technology.

* * * * *